(12) United States Patent
Megason

(10) Patent No.: US 6,567,264 B2
(45) Date of Patent: May 20, 2003

(54) CIRCUIT BOARD LATCH AND REMOVAL SIGNAL GENERATOR

(75) Inventor: George D. Megason, Spring, TX (US)

(73) Assignee: Hewlett-Packard Development Company L.P., Houston, TX (US)

( * ) Notice: Subject to any disclaimer, the term of this patent is extended or adjusted under 35 U.S.C. 154(b) by 0 days.

(21) Appl. No.: 09/966,654

(22) Filed: Sep. 28, 2001

(65) Prior Publication Data

US 2003/0063435 A1 Apr. 3, 2003

(51) Int. Cl.⁷ .................................................. H01H 9/06
(52) U.S. Cl. ........................ 361/684; 361/801; 439/164; 200/43
(58) Field of Search ................................. 361/684, 683, 361/686, 801; 312/223.1–223.3; 439/164, 188, 15, 172; 200/61.86, 43

(56) References Cited

U.S. PATENT DOCUMENTS

| | | | | |
|---|---|---|---|---|
| 3,878,346 A | * | 4/1975 | Green | 200/43 |
| 5,583,327 A | * | 12/1996 | Black, III | 200/61.86 |
| 5,629,505 A | * | 5/1997 | Cryer | 200/61.54 |
| 5,687,592 A | * | 11/1997 | Penniman et al. | 361/683 |

* cited by examiner

*Primary Examiner*—Darren Schuberg
*Assistant Examiner*—Hung Van Duong

(57) ABSTRACT

A combination mechanical latch and electrical switch. The latch comprises a shaft having a knob on one end for manual actuation and a pawl for providing a latching/unlatching action. The latch shaft passes through a rotary electrical switch with a hole through its axis of rotation. The shaft is coupled to the rotating contactor of the rotary switch so that the contactor acts as a bearing for the rotation of the shaft. The latch is mechanically engaged when the switch is in one position and is disengaged when the switch is in the other position. Mechanical latching and unlatching are thus achieved approximately simultaneously with electrical on and off switching. The mechanical latch portion of the latch/switch combination can be used to prevent removal of a component of an electronic computing system until the switch signals the computer's operating system that the removal is about to occur.

21 Claims, 4 Drawing Sheets

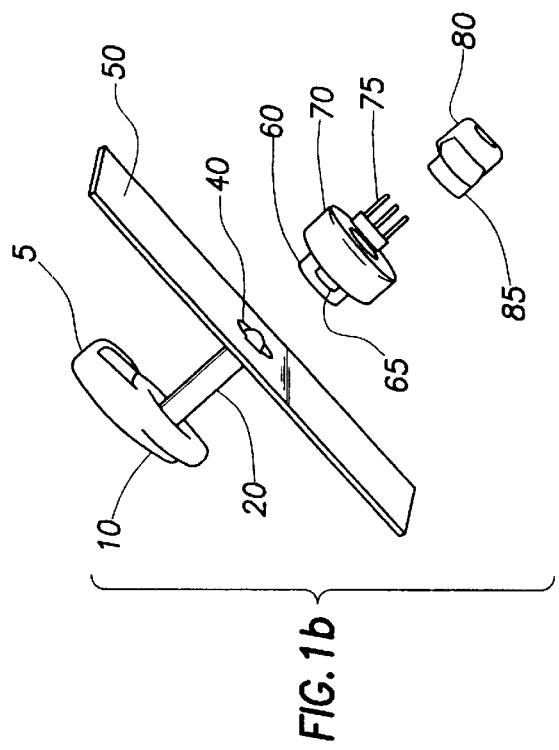
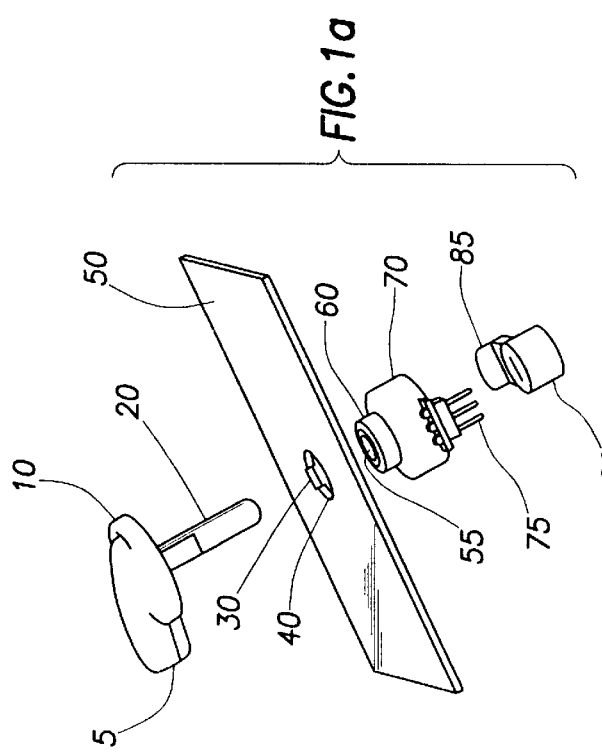

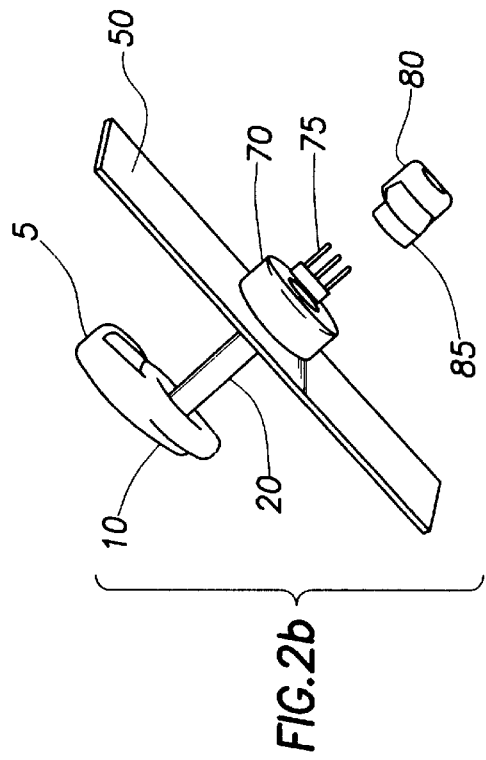
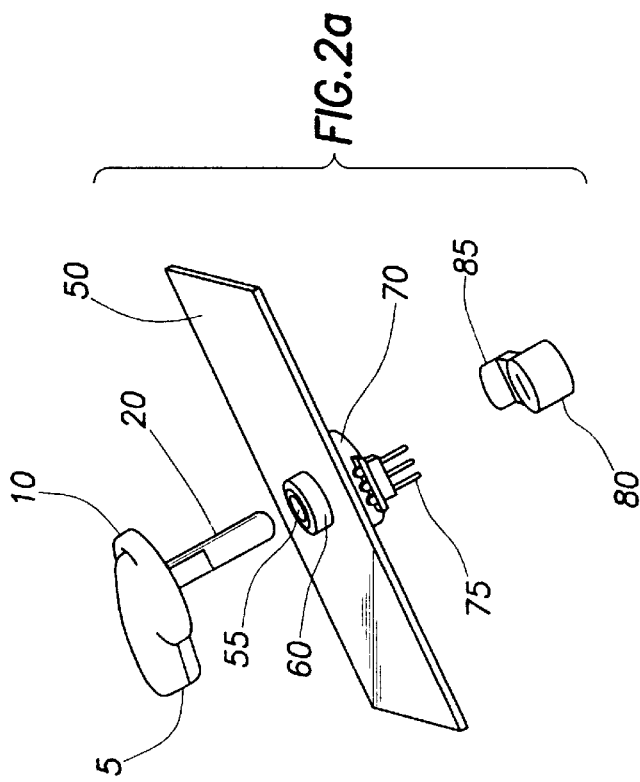

CIRCUIT BOARD LATCH AND REMOVAL SIGNAL GENERATOR

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention generally relates to computer systems using hot pluggable circuit boards and more particularly to a combination mechanical latch and connection signaling device for such boards.

2. Background of the Invention

Computer systems typically include a number of printed circuit boards (PCBs) that are plugged into sockets on a motherboard or backplane. Various components such as memory chips are carried on such PCBs. The computer's functional capabilities can be increased by adding new boards to open sockets and can be upgraded by replacing existing boards with new ones. The capacities of individual random access memory (RAM) chips are constantly increasing and it is common for computer owners to increase a computer's RAM by adding new memory boards when empty memory sockets are available, or replacing older lower capacity memory boards with new high capacity boards.

To avoid damage to boards being plugged into a computer system, it has in the past been required that the computer be powered down and preferably unplugged from its power source before any board additions are made. Newer boards, particularly memory boards, have been developed which may be plugged into a computer system while it is powered up and operating, without damage to the board. However, such hot pluggable boards do not avoid disruption of existing computer operations when an old board is removed to make room for a replacement board. To avoid such disruption, the main computer operating system needs to be notified that a board is about to be removed. With proper notification that a memory board is to be unplugged, the computer's memory management system can move any stored programs or data to other memory and continue operating.

It would therefore be desirable to provide a device for notifying a computer operating system in advance of the insertion or removal of hot pluggable boards and for preventing removal without such notification.

BRIEF SUMMARY OF THE INVENTION

The problems noted above are solved in large part by a combination mechanical latch and electrical switch. The switch portion of this combination comprises a rotary electrical switch, typically a two-position switch, with a hole through its axis of rotation. The latch portion comprises a shaft with a knob on one end for manual actuation. The shaft passes through the hole in the switch and is coupled to the rotating contactor of the switch. The rotating contactor acts as a bearing for the rotation of the shaft. A pawl that provides a latching/unlatching action can be attached to the shaft or can be an integral part of the knob. The pawl causes the latch to be mechanically engaged when the switch is in one position and mechanically disengaged when the switch is in the other position. Mechanical latching and unlatching are achieved approximately simultaneously with electrical switching. The latch/switch combination can be used to prevent the removal of a component of an electronic computing system until the switch signals the computer's operating system that the removal is about to occur.

BRIEF DESCRIPTION OF THE DRAWINGS

For a detailed description of the preferred embodiments of the invention, reference will now be made to the accompanying drawings in which:

FIGS. 1a and 1b show exploded views of a circuit board latch/removal signal generator assembly;

FIGS. 2a and 2b show exploded views of a partially installed circuit board latch/removal signal generator assembly;

NOTATION AND NOMENCLATURE

Figure 3B:
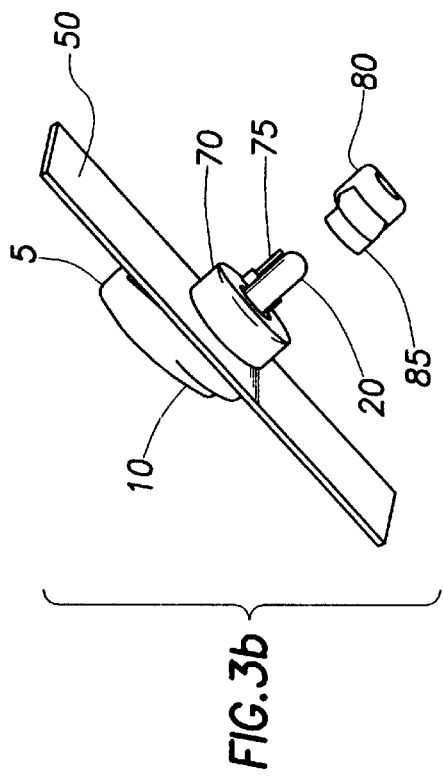
FIGS. 3a and 3b show exploded views of a further step in the installation of a circuit board latch/removal signal generator assembly.
Figure 3A:
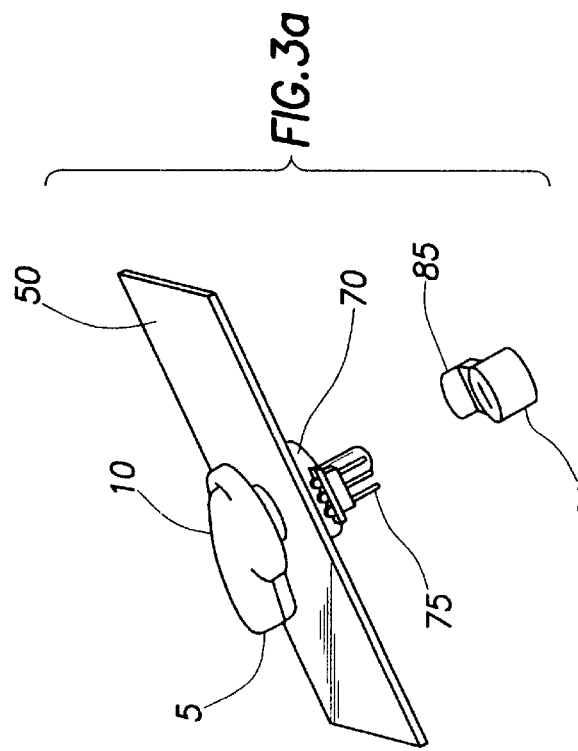
Figure 4A:
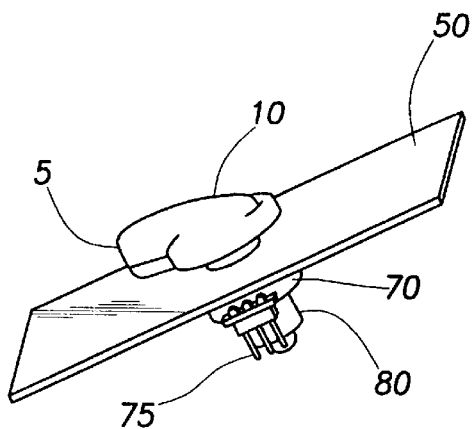
FIGS. 4a and 4b show a fully installed circuit board latch/removal signal generator assembly.
Figure 4B:
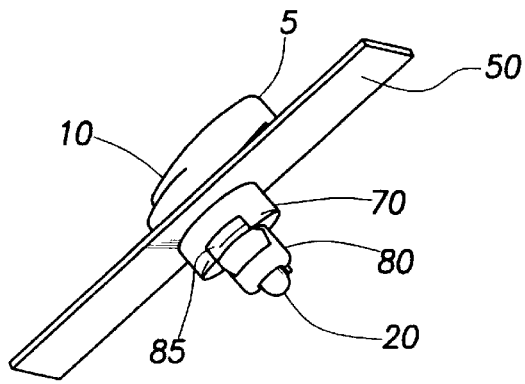

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct connection. Thus, if a first device couples to a second device, that connection may be through a direct connection, or through an indirect connection via other devices and connections.

DETAILED DESCRIPTION OF EMBODIMENTS

The invention relates to a combination of a mechanical latch assembly and a rotary switch. For purposes of this specification, the term "mechanical latch" can be defined to mean any device that can cause two or more objects to be coupled to each other in such a manner that physical movement of one or more of the objects is restricted. "Rotary switch" can be defined to mean a switch in which the rotation of a knob or similar device causes electrical power to be applied to or removed from a circuit. Rotary switches typically have a two-position design wherein rotation of the knob to one position turns a circuit on and rotation of the knob to the other position turns the circuit off. A detent mechanism is typically present in the switch to hold the switch in either the on or off position.

Existing rotary switches are typically composed of a switch body with an integral shaft. A knob is typically attached to the end of this shaft and used to actuate (rotate) the switch. If additional mechanical action, such as a latch/unlatch feature, is needed, a separate mechanism is required to connect the switch and mechanical latch. This additional interface requires more space and is more complex in design than the use of a through-hole rotary switch assembly that allows a single knob to actuate both electrical and mechanical functions. While through-hole potentiometers exist on the market today, applicant is not aware of any through-hole, two-position switches, especially any that offer the ability to be mounted to a surface without the use of tools and that also provide the ability to actuate a mechanical latch at the same time they operate an electrical switch.

The combination of rotary switch and mechanical latch used in the present invention allows for a single knob to easily and simultaneously actuate both electrical on/off and mechanical latching/unlatching functions. Many of the components of an embodiment of the invention can be seen in FIGS. 1–5. The switch portion 70 of the combination typically comprises a switch housing and a rotating core, both typically made of injection molded plastic. The rotating core of the switch 70 has a hole 55 through the axis of rotation. A printed circuit board containing electrical switching components makes up the back of the switch 70. Internal switching contacts are typically made of electrically conductive metal. A small connector 75 mounted on the printed circuit board provides an electrical interface to external components. In the embodiment of the invention shown in FIGS. 1–5, a single-pole, double-throw switch is used. Therefore, three contacts are present on the connector 75. The switch 70 can be electrically coupled to other components via cables connected to the connector 75.

The mechanical latch assembly portion of the combination comprises a shaft 20, a knob 10, and a retainer 80 which are typically made of injection molded plastic. The detent mechanism of the rotary switch 70 preferably also holds the latching mechanism in either the latched or unlatched position. In alternative embodiments other materials besides injection molded plastic could be used for the switch housing, core, shaft 20, knob 10, and/or retainer 80.

In an embodiment of the invention, the latch/switch combination contains a small rotary switch 70 with a D-shaped hole 55 through the axis of rotation. The front of the switch 70 has a protrusion 60 that can be pressed into a hole 40 in a mounting surface 50 (sheet metal, for example). A tab (65 in FIG. 1b) on the protrusion 60 fits into a similarly shaped notch (30 in FIG. 1a) in the mounting hole 40 to prevent rotation of the switch 70 in the mounting hole 40. The rear of the switch 70 is composed of a printed circuit board (PCB) that is heat-staked to the body of the switch 70. A hole in the PCB acts as the rear bearing surface for the rotating core.

A shaft 20, typically including an integral knob 10, passes through the D-shaped hole 55 in the switch 70. The shaft 20 typically has a D-shape and a diameter approximately equal to that of the hole 55 in the switch 70 so that it passes through the switch 70 in only one orientation and mechanically engages with the rotating core of the switch 70. The rotating core of the switch 70 acts as a bearing for the rotation of the shaft 20.

A retainer 80 is typically attached to the end of the shaft 20 opposite the knob 10, confining the switch 70 between the retainer 80 and the knob 10. The retainer 80 can have a D-shaped hole of approximately the same diameter as the shaft 20 so that the retainer 80 and the shaft 20 fit together in such a manner that the shaft 20 cannot rotate within the retainer 80. The retainer 80 can be coupled to the shaft 20 by friction or by some other means of fastening such as a set screw. Coupling by friction is the preferred embodiment since this allows attachment of the retainer 80 to the shaft 20 without the use of tools.

The end of the shaft 20 opposite the knob 10 is typically split so that a gap exists between two opposite sides of the shaft 20. These sides can be bent inward toward the gap to give the split end a smaller diameter than the remainder of the shaft 20 thus allowing the end to fit through a smaller diameter opening than the remainder of the shaft 20. On the outer portions of the split sides of the shaft 20, ramp-shaped protrusions typically exist which tend to increase the inward bending of the sides as the split end is inserted through an opening. When the protrusions have been inserted completely through an opening, such as the opening in the retainer 80, the shaft 20 cannot easily be moved in the direction opposite from the direction of insertion because the non-sloping edges of the protrusions extend beyond the diameter of the opening and tend to block the removal of the shaft 20.

In an alternative embodiment, a separate retainer 80 is not used. Instead, notches could be present inside the hole 55 in the switch 70. The protrusions on the shaft 20 could "catch" on these notches and prevent removal of the shaft 20 in a manner similar to that described above.

A pawl typically extends from either the retainer 80 or the knob 10. For purposes of this specification, the term "pawl" can be defined as an arm or similar protrusion extending radially from a rotating component. When the knob 10 is rotated, the switch 70 toggles between the on and off positions and the pawl is simultaneously rotated. This rotation of the pawl can be used to achieve a mechanical latching and unlatching action. For example, in the case where a pawl extends from the retainer 80, the pawl 85 can engage a latching mechanism below the mounting surface 50 when the switch 70 is in one position but disengage the mechanism when the switch 70 is in the other position.

Alternatively, when a pawl extends from the knob 10, the shape and/or size of the pawl 5 can provide a mechanical block. For example, a mechanical latch or some other type of actuation mechanism may be present below the mounting surface 50 and may be accessible through a hole in the mounting surface 50. If the pawl 5 physically blocks access to this hole when the knob 10 is in one position and allows access in the other position, the same type of simultaneous mechanical latching and electrical switching action described above can be achieved.

Figure 5:
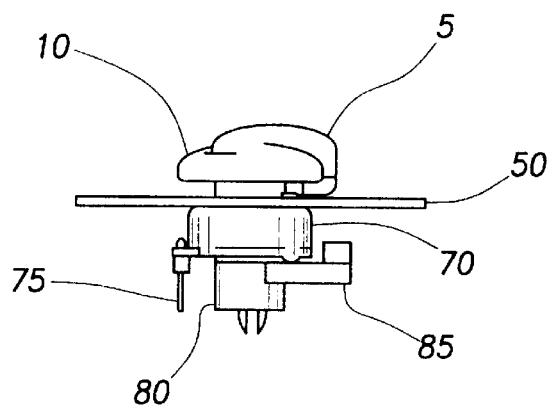
FIG. 5 shows a side view of a complete circuit board latch/removal signal generator assembly.

The steps in the attachment of the components of the latch/switch combination to each other and to a mounting surface are illustrated in FIGS. 1–5. In FIGS. 1a and 1b, the protrusion 60 on the front portion of the switch 70 is pressed into the hole 40 in the mounting surface 50 with the tab 65 on the protrusion 60 aligned with the notch 30 in the mounting hole 40. This results in the configuration shown in FIGS. 2a and 2b. The shaft 20 with integral knob 10 is inserted through the switch 70 from the front (the opposite side of the mounting surface 50 from the switch 70). The knob 10 rests against the mounting surface 50 on one side, as shown in FIGS. 3a and 3b, and the retainer 80 snaps on the opposite end of the shaft 20 and rests against the back side of the switch 70, as shown in FIGS. 4a and 4b. Tool-less installation of the latch/switch combination is thus achieved by capturing the switch 70 between the knob 10 and retainer 80, thereby preventing the switch 70 from backing out of the hole 40 in the mounting surface 50 and preventing the shaft 20 from backing out of the hole 55 in the switch 70. The completed assembly is shown in FIG. 5.

Other embodiments of the switch, knob, shaft, retainer, and pawl, in addition to those described above, may be used. For example, the shaft can be of diverse sizes or shapes as long as it fits through the hole in the switch and is mechanically coupled to the rotary part of the switch. The hole in the switch can have shapes other than a D-shape as long as some means of coupling the shaft to the switch can be achieved.

The invention may be used to control the removal of memory boards in computer systems. Hot pluggable memory (that is, memory that can be removed and replaced while the computer is in operation) should be mechanically latched to prevent accidental removal of active components. Additionally, there should be a way to notify and prepare the computer's memory management system for removal of memory components. This functionality would ideally be contained in a small space with limited structural strength. The present invention provides a flexible, small, robust, and inexpensive means for meeting these constraints. The pawl can be used to mechanically engage the memory board and prevent its removal. The pawl is disengaged and the board can be removed only when the switch is turned and a signal is thereby sent to the computer's memory management system that removal is about to occur. Transmission of the signal occurs immediately upon the turning of the switch but removal of the board typically occurs only after the human operator completes the physical movements needed to bring about the removal. In this way, the memory management system is always notified before the board is removed.

Other types of peripheral cards besides memory cards can be hot pluggable. The combination mechanical latch/rotary switch can be used with any such card to signal a computer operating system that removal of the card is about to occur.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A combination mechanical latch and electrical switch comprising:
   a rotary electrical switch having an aperture through the axis of rotation; and
   a mechanical latching device passing through said aperture of said switch and coupled to a rotating core within said switch.

2. The latch and switch combination of claim 1 wherein:
   said latching device prevents removal of a computer component until the switch provides a signal to the computer's operating system that removal is about to occur.

3. The latch and switch combination of claim 2 wherein:
   said latching device comprises a shaft with a knob for manual actuation of the switch and the latching device and a pawl for providing a latching/unlatching action, said shaft passing through said aperture of said switch and coupled to said rotating core within said switch.

4. The latch and switch combination of claim 3 wherein:
   said pawl is formed as part of said knob.

5. A method for notifying a computer's operating system that the removal of an active component is about to occur comprising:
   mechanically preventing removal of the component until an electrical signal is sent to the computer's operating system that removal is about to occur.

6. The method of claim 5 wherein:
   the prevention and notification of removal are achieved through the use of a combination mechanical latch and electrical switch.

7. The method of claim 5 wherein said active component is a memory board, further comprising:
   upon sending the electrical signal to the operating system, copying data stored on said memory board to another device.

8. The method of claim 6 wherein:
   the latch comprises a shaft with a knob for manual actuation of the switch and the latch and a pawl for providing a latching/unlatching action, said shaft passing through said aperture of said switch and coupled to a rotating core within said switch.

9. A computer system comprising:
   a circuit board coupled to a computer mother board by a socket,
   a mechanical latch having a rotating shaft and a pawl coupled to said shaft, said pawl positioned to interfere with removal of said circuit board from said socket when said shaft is in a first position, and said pawl positioned to not interfere with removal of said circuit board when said shaft is in a second position, and
   a rotary electrical switch having a housing and a rotating core, said rotating core having an aperture positioned about said rotating shaft, said shaft coupled to said rotating core, said switch being in a first electrical state when said shaft is in said first position and being in a second electrical state when said shaft is in said second position.

10. The computer system of claim 9 wherein said circuit board is a memory board, further including:
    a memory management system coupled to said electrical switch and treating said memory board as active memory when said shaft is in said first position and treating said memory board as inactive when said shaft is in said second position.

11. The computer system of claim 9 wherein said circuit board is a memory board, further including:
    a memory management system coupled to said electrical switch and upon movement of said shaft from said first position to said second position, copying data stored on said memory board to another device.

12. The computer system of claim 9 wherein:
    said circuit board is a hot swappable circuit board.

13. Apparatus for indicating imminent removal of an active component from an electronic system comprising:
    a mechanical latch having a rotating shaft and a pawl coupled to said shaft, said pawl positioned to interfere with removal of said active component from said electronic system when said shaft is in a first position, and said pawl positioned to not interfere with removal of said active component when said shaft is in a second position, and
    a rotary electrical switch having a housing and a rotating core, said rotating core having an aperture positioned about said rotating shaft, said shaft coupled to said rotating core, said switch being in a first electrical state when said shaft is in said first position and being in a second electrical state when said shaft is in said second position.

14. Apparatus according to claim 13 wherein:
    said switch housing is mechanically supported by said electronic system.

15. Apparatus according to claim 13 wherein:
    said rotary switch is a single pole single throw switch.

16. Apparatus according to claim 13 wherein:
    said rotary switch is a single pole double throw switch.

17. Apparatus according to claim 13 further including:
means for deactivating said active component upon movement of said shaft from said first position to said second position.

18. Apparatus according to claim 13 wherein:
said active component is a memory board.

19. Apparatus according to claim 14 wherein:
said shaft is mechanically supported by said rotary switch.

20. Apparatus according to claim 19 wherein:
said rotating core forms a bearing for said rotating shaft.

21. Apparatus according to claim 18 wherein:
said memory board is hot pluggable.

* * * * *